W. WEAVER.
Screw and Bolt.
No. 52,631.                        Patented Feb. 13, 1866.
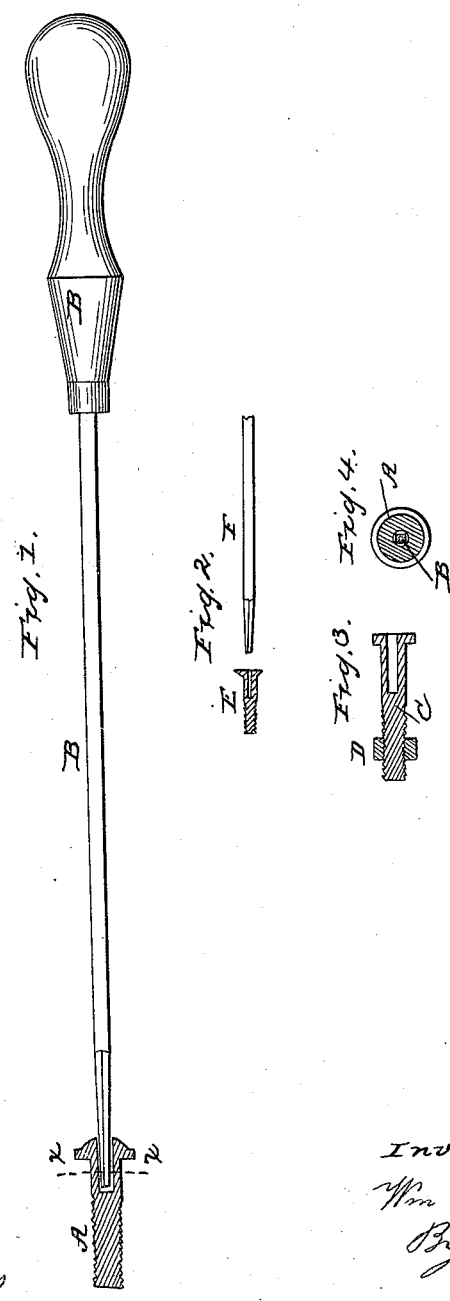

UNITED STATES PATENT OFFICE.

WILLIAM WEAVER, OF NASHUA, NEW HAMPSHIRE.

IMPROVEMENT IN SCREWS AND BOLTS.

Specification forming part of Letters Patent No. 52,631, dated February 13, 1866.

*To all whom it may concern:*

Be it known that I, WILLIAM WEAVER, of Nashua, in the county of Hillsborough and State of New Hampshire, have invented a new and useful Improvement in Screws, Bolts, &c.; and I do hereby declare that the following is a full, clear, and exact description thereof, which will enable others skilled in the art to make and use the same, reference being had to the accompanying drawings, forming part of this specification, in which—

Figure 1 is a longitudinal central section of a bolt, and showing a driver in place for driving the same. Fig. 2 is a longitudinal central section of a small screw, showing my improvement, and a side view of the lower end of a driver for driving the same. Fig. 3 is a longitudinal central section of a bolt and nut, showing my improvement. Fig. 4 is a cross-section through the line *x x*, Fig. 1.

When screws, bolts, &c., are constructed in the ordinary manner—that is to say, with slotted heads—it has been found in practice that if the slot is made shallow the screw-driver will not have sufficient hold to drive the screw or bolt home, and by slipping and getting out of the slot it will soon so wear off the shoulders of the slot as to make it nearly impossible to move the screw either out or in; and that if, on the other hand, the slot is made deep, there is a liability of breaking off one-half the head of the screw, rendering necessary a great expenditure of time and patience in removing the screw. These difficulties occur especially when it is necessary that the screws or bolts should be driven hard, so as to have a firm hold.

The object of my invention is to obviate these difficulties, and to furnish screws and bolts which may be driven with any degree of force or for any number of times without injuring or weaking them in any respect; and it consists in perforating the heads of screws and bolts of all kinds that are made with a screw-thread and driven by lever-power applied to their heads.

A, Fig. 1, is a screw-bolt having its head perforated with a circular hole. The bolt is driven with a driver, B, in the manner represented in Fig. 1—that is, by the friction between the driver B and the surface of the perforation. The lower end, or part of the driver which enters the perforation, should be squared; but this shape is not absolutely necessary, and any other shape, even a round driver, could be used; but I prefer the square form, as it bites more firmly on the sides of the perforation C D.

Fig. 3 is a section of a screw-bolt and nut, showing my improvement as applied to such bolts E.

Fig. 2 illustrates the application of my improvement to a small gimlet-pointed wood-screw, and shows a portion of the driver F for driving the same.

This improvement is applicable to screws or screw-bolts, and I have applied it to watch-screws so small that the driver was made of a small needle.

It will be observed that the perforations in the screws or bolts are slightly beveled—that is to say, they are a little narrower at the bottom than they are at the top, to give the driver a better hold upon the inner surface of the perforations and to compensate for any wear in the perforation or of the driver.

I claim as new and desire to secure by Letters Patent—

Perforating the heads of screws and screw-bolts of all kinds that are made with a screw-thread and operated by a lever-power applied to their heads, substantially as described, and for the purposes set forth.

WILLIAM WEAVER.

Witnesses:
A. McKEAN,
GEO. E. WILDER.